Nov. 6, 1934.

A. L. ATHERTON 1,979,660

SECTIONAL MERCURY ARC RECTIFIER

Filed Jan. 28, 1932  6 Sheets-Sheet 2

INVENTOR
Alfred L. Atherton
BY
ATTORNEY

Nov. 6, 1934.　　　　A. L. ATHERTON　　　　1,979,660
SECTIONAL MERCURY ARC RECTIFIER
Filed Jan. 28, 1932　　　6 Sheets-Sheet 3

WITNESSES:
Fred C. Pelham
R. J. Fitzgerald

INVENTOR
Alfred L. Atherton
BY O. B. Buchanan
ATTORNEY

Nov. 6, 1934.  A. L. ATHERTON  1,979,660
SECTIONAL MERCURY ARC RECTIFIER
Filed Jan. 28, 1932  6 Sheets-Sheet 4

INVENTOR
Alfred L. Atherton
BY O. B. Buchanan
ATTORNEY

Nov. 6, 1934.　　　　A. L. ATHERTON　　　　1,979,660
SECTIONAL MERCURY ARC RECTIFIER
Filed Jan. 28, 1932　　　6 Sheets-Sheet 6

WITNESSES:
Fred C. Wilhem
R. J. Fitzgerald

INVENTOR
Alfred L. Atherton
BY O. B. Buchanan
ATTORNEY

Patented Nov. 6, 1934

1,979,660

UNITED STATES PATENT OFFICE 1,979,660

SECTIONAL MERCURY-ARC RECTIFIER

Alfred L. Atherton, Verona, Pa., assignor to Westinghouse Electric & Manufacturing Company, a corporation of Pennsylvania Application January 28, 1932, Serial No. 589,414

17 Claims. (Cl. 175—363)

The present invention relates to large metal-tank mercury-arc rectifiers and it has particular relation to making such rectifiers out of a plurality of smaller rectifier-tanks which are structurally separate and complete in themselves, but which are mounted and electrically handled as if they constituted one large tank or unit-installation.

The broad idea of sectionalizing a metal-tank mercury-arc rectifier is based upon what appears to be a heretofore unrecognized fact that, basically and permanently, the metal-tank mercury-arc rectifier is at its best only in the smaller sizes. Its efficiency is dependent upon the internal losses or arc-drops, and these are directly affected by the length and nature of the path for current between the cathode and the several anodes. A decrease in the length of this arc-path will decrease the losses. A decrease in the restrictions in this arc-path will decrease the losses. A decrease in the deionizing surfaces present in the neighborhood of the arc-path will decrease the losses. All of these changes represent gains in efficiency which go inherently with a decrease in the size of the unit. Heretofore, the reliability of operation, particularly in regard to freedom from arcing back, is very much better in the small units than in the large units. In the larger structures, more anodes are used and probably a wider differential is obtained in the vapor pressure between the cathode and the mercury-condensing cooling surfaces, besides which it is usually necessary to introduce additional shielding or deionizing grids to safeguard against back-fires.

According to my present conception of back-fire causes, as explained more at length in my co-pending application on a Central-blast rectifier and water temperature controlling means therefor, Serial No. 589,415, filed January 28, 1932, back-fires are a random occurrence resulting from more or less random and uncontrolled eddies and gusts in the vapor conditions within the tank, which occasionally, once in a great while, result in blowing a large number of ionized vapor-particles, or possibly a pocket of foreign gases, into a region between an inactive anode and some other part of the tank, causing a breakdown in the normal insulating properties of the vapor during the inactive periods of the anodes. The mercury vapor flows from the cathode at immense velocities, and its vapor-flow path includes various devices which are far from being "stream lined". This undoubtedly results in a confusion of cross currents and eddies, giving a kaleidoscopic variety of conditions, varying over wide limits from point to point and from time to time. The extent of this variation in the local conditions seems likely to be greater in the larger tanks than in the smaller and simpler structures of mercury-arc rectifiers. It thus appears that the smaller reliability and the poorer efficiency of the large rectifier tanks is basic and permanent, rather than a temporary condition due to lack of as complete development in manufacturing practices and design details than is the case in connection with the smaller tanks.

These thoughts in relation to the fundamental effects of size, performance, reliability and efficiency are original and, so far as I know, new. Considering efficiency alone, aside from any relative advantage in freedom from back-fires, the smaller sizes of tanks have already been built with full-load arc-drops of 20 and 21 volts, whereas the larger tanks have full-load arc-drops of approximately 29 volts. There are indications that the arc-drop in the smaller tanks may be brought down to even smaller values of 16 volts or possibly even 13 volts, thus reducing the losses by more than 50%. The saving thus obtained, at prevailing rates of cost of power, capitalized at 15%, would be more than sufficient to warrant the scrapping of old rectifiers and putting in my new efficient design.

When the thought of sectionalizing a metal-tank mercury-arc rectifier is first contemplated, the reaction is that it might have benefits from some viewpoints but that the complications and space requirements would be prohibitive. By my unitary structural-supporting means and novel electrical connections, however, I have been able to bring about a material reduction both in the floor space and in the vertical height necessary for my sectional design as compared to a large single-tank unit.

With the foregoing objects in view, my invention consists of the novel system of rectifier installation and operation, in the novel structural designs, and in the novel electrical connections and systems, whereby the benefits of sectional-type rectifier construction are maintained.

My invention will be more clearly understood by reference to the accompanying drawings, wherein Figure 1 is a diagrammatic view of circuits and apparatus illustrating the electrical connections of one of my sectional-type rectifiers.

Figure 6:
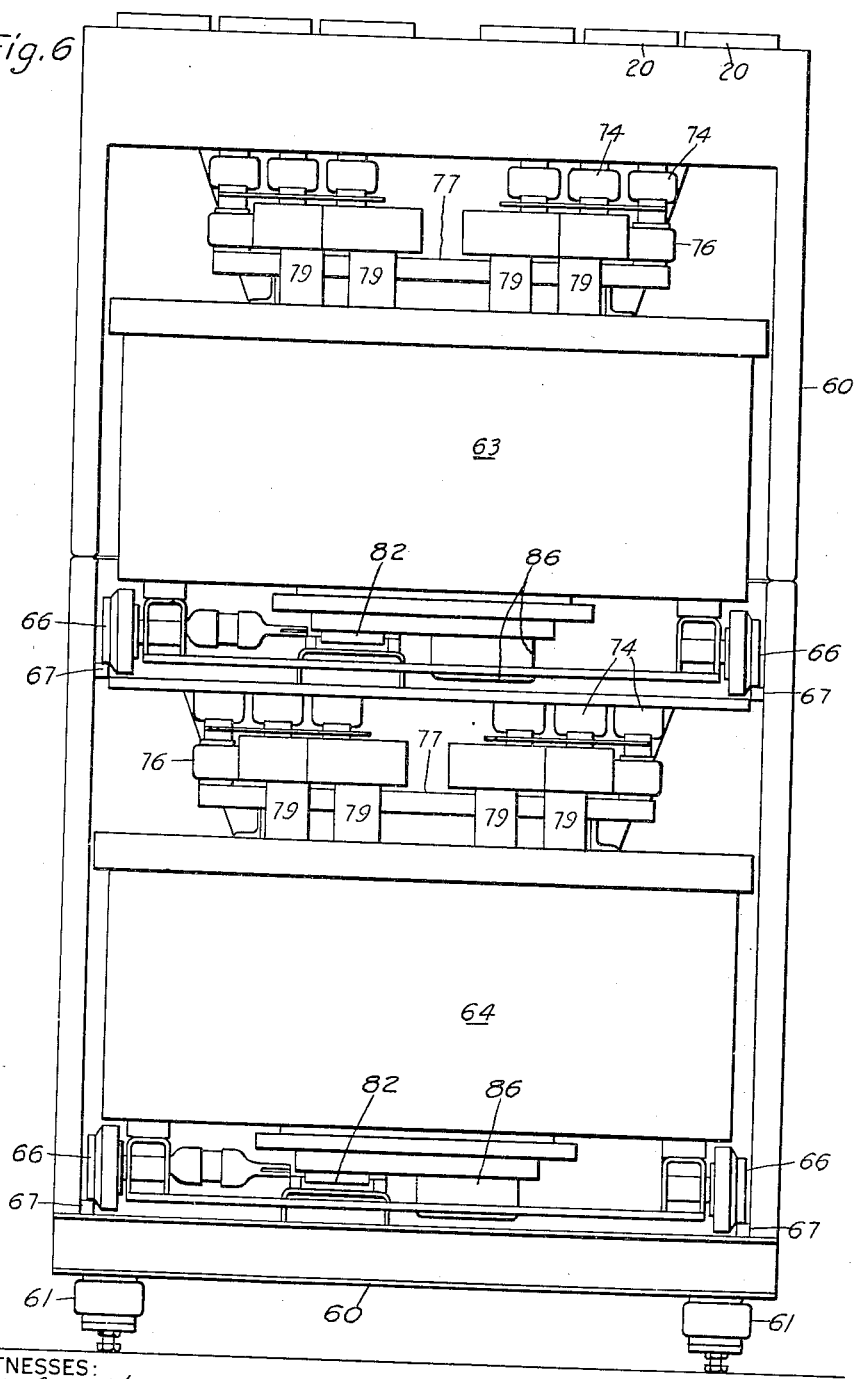
Fig. 6 is a front view of a two-section frame embodying my sectionalized design.
Figure 7:
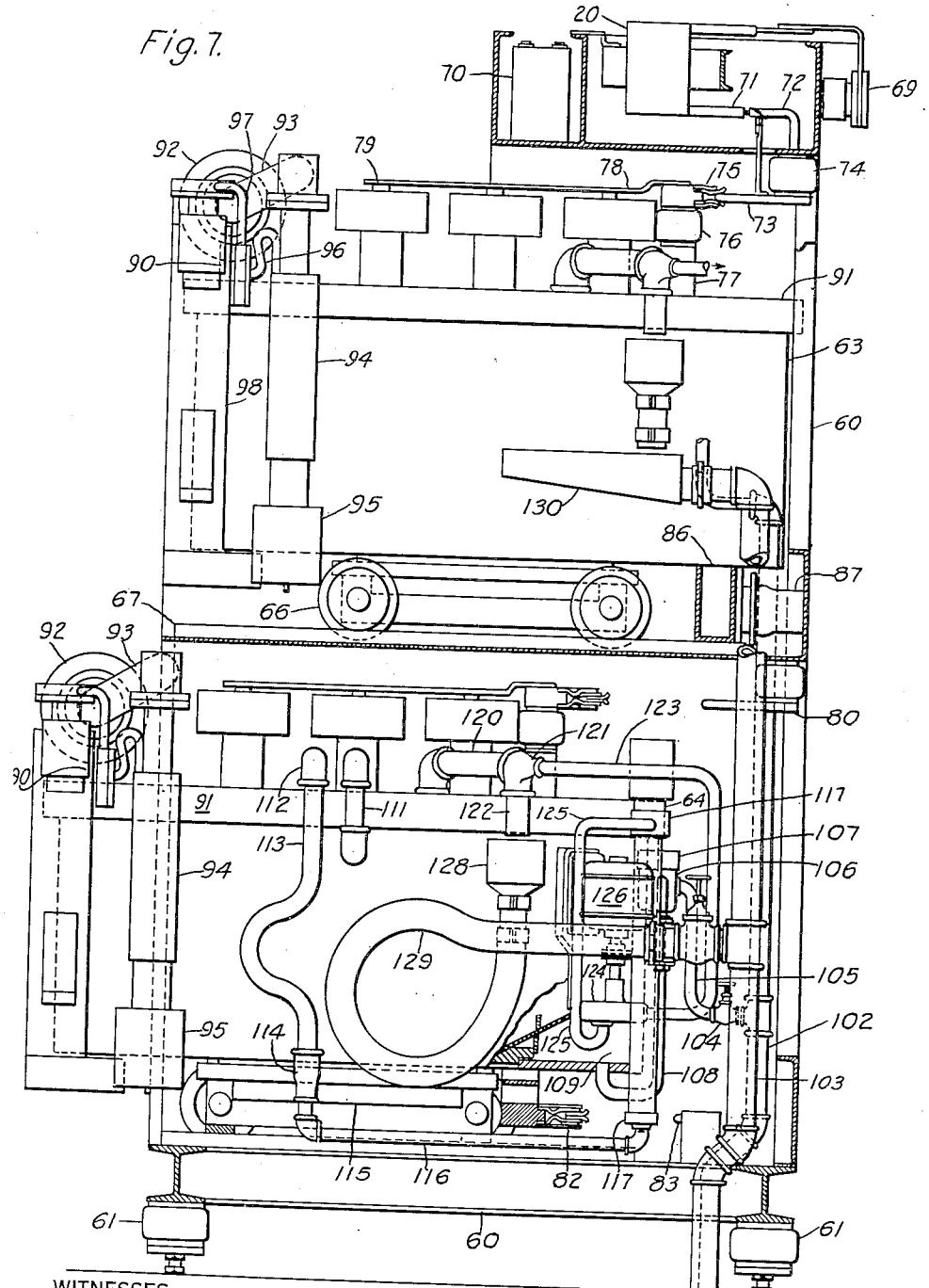
Fig. 7 is a side view of the same.

I shall illustrate my invention in connection with a sectionalized design utilizing sections rated at 750 kw. at 600 volts. Figures 1 to 4 show a four-section installation having a total capacity of 3000 kw., and Figures 6 and 7 illustrate a supporting frame structure for mounting the sections in units of two sections each, mounted one on top of the other, so that as many pairs of sections may be built up as may be desired. Each of the sections is a complete rectifier-tank in itself, having six anodes, and having its own water jackets or other cooling system and having its own vacuum pumping or evacuating system.

Figure 1:
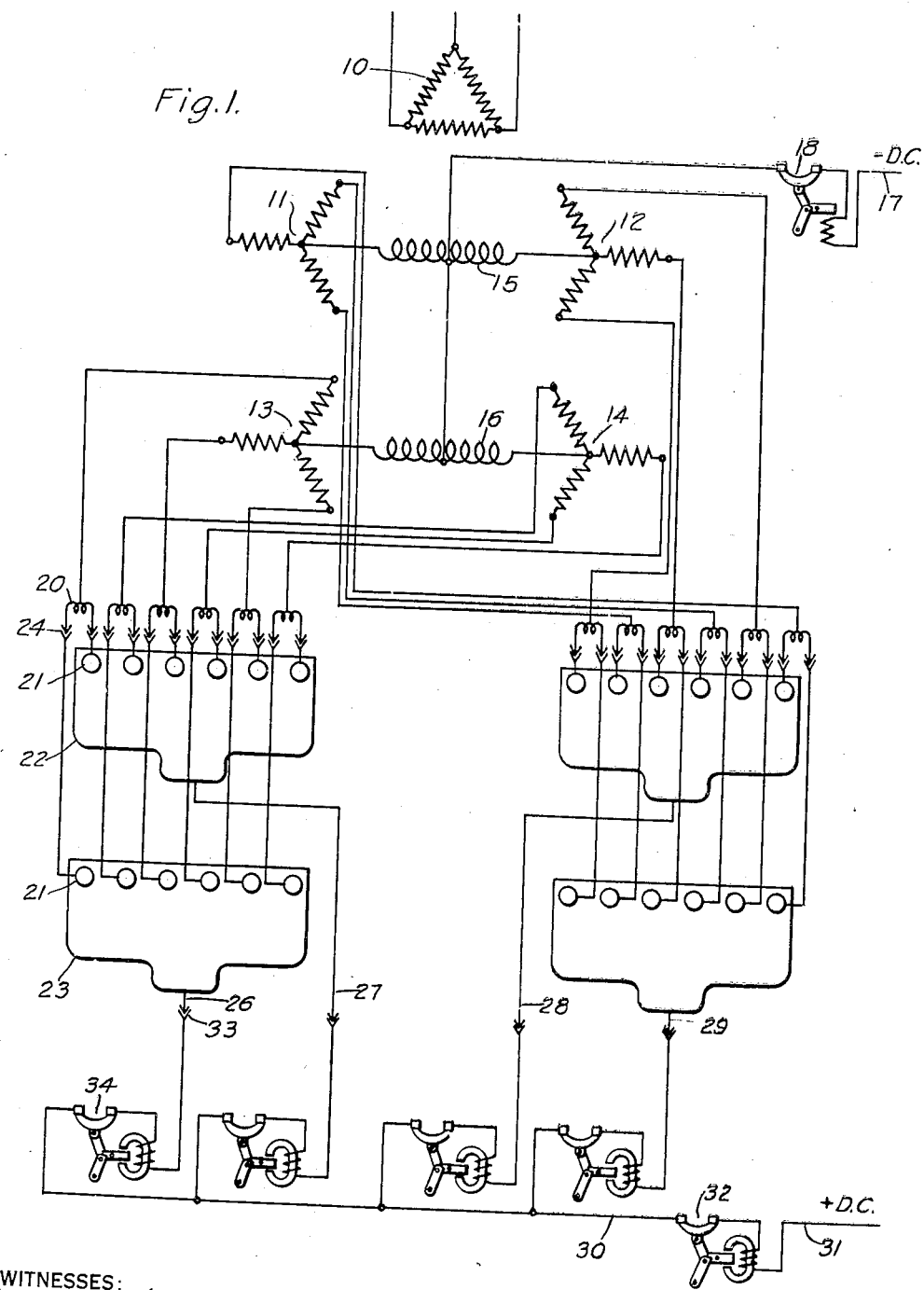

Figure 1 shows, in diagrammatic form, the electrical connections for a four-section unit, in a preferred form of embodiment of my invention. Alternating-current power is supplied from a transformer having a delta-connected primary winding 10 and four star-connected secondary windings 11, 12, 13 and 14, the windings 11, 13 being in phase with each other and the windings 12 and 14 being of diametrically opposite phase. The star points of secondary windings which are out of phase with each other must be connected by interphase balance coils, so as to secure the proper parallel operation of anodes in the rectifier tanks. In Figure 1 there are two such interphase balance coils used, as indicated at 15 and 16, the mid-points of these balance coils being connected together and both being connected to the negative direct-current bus 17 through an overload circuit breaker or other disconnecting means 18.

Each of the twelve terminals of the four three-phase windings 11, 12, 13 and 14 terminates in the mid-point of an individual anode balance coil 20, of which there are, therefore, twelve. The two end terminals of each anode balance coil 20 are connected to the anode leads of a corresponding anode 21, 21 in each of two superposed tanks or sections 22 and 23, the connection being made through disconnectible plugs or jacks 24, as will be more particularly described in connection with Figures 6 and 7.

In the connections shown in Figure 1, therefore, each pair of two superposed sections receives power from a six-phase source and each phase is divided into two parts by an anode balance coil 20.

The cathode leads 26, 27, 28 and 29 of the four tanks are all connected in parallel to a common bus 30 which is connected to the positive direct-current circuit-conductor 31 through a polarized or reverse-current circuit breaker 32 or other disconnecting means. The cathode leads 26, 27, 28 and 29 are not connected directly to the bus 30 but are connected through disconnecting plugs or jacks 33 and through individual reverse-current circuit breakers 34, in the form of invention shown in Figure 1.

When a system such as that shown in Figure 1 is put into operation, each tank, being provided with its own starting electrodes, will start by itself. It is necessary, however, to have sufficient impedance in the anode supply-circuit connections to insure the proper parallel operation of a plurality of anodes, because over part of the current range the arc has a negative characteristic, that is, its voltage decreases with an increase of current, and because the magnitude of the various arc voltages will vary somewhat. It is necessary, also, to have sufficient impedance between anodes to assure proper parallel operation of the right-hand pair of tanks with the left-hand pair of tanks by absorbing the triple frequency voltage difference introduced by the fact that the left and right hand windings are 30° out of phase. This anode impedance is obtained by the transformer connections described, the interphase balance coils 15 and 16, and the anode balance coils 20. The anode balance coils 20 serve a further purpose, in that at the moment of starting, when one of the tanks, 22, for example, starts first, if it were not for the anode balance coils 20, it would practically short-circuit the voltage applied to the anodes of the cooperating tank 23, reducing it from 600 volts to the arc voltage of about 15 or 20 volts. The anode reactors or balance coils 20 may be readily made, however, to have as high a voltage as need be, when supplying current through only one-half of their windings, thereby impressing, on the tank which is slow in starting, a voltage sufficiently high to make it start quickly.

Figure 2:
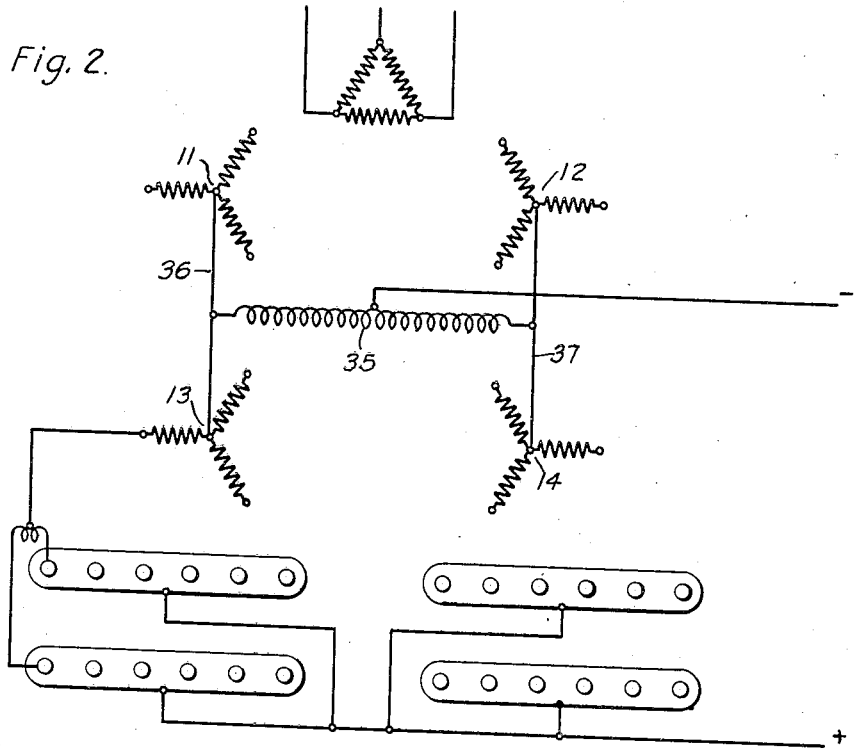
Figs. 2, 3 and 4 are simplified diagrammatic views of modifications in the electrical circuits and arrangements.

Figure 2 shows a slight modification of the connection shown in Figure 1, utilizing only a single interphase balance coil 35 instead of the two interphase balance coils 15 and 16. This is accomplished by solidly connecting the star points of the two windings 11 and 13 which are in phase with each other, by a connection 36, solidly connecting the star points of the other two windings 12 and 14 which are in phase with each other, by a connection 37, the interphase balance coil 35 being connected between the two connections 36 and 37. The operation is otherwise the same as in Figure 1 except that the individual cathode-lead circuit breakers 34 are omitted.

Figure 3:
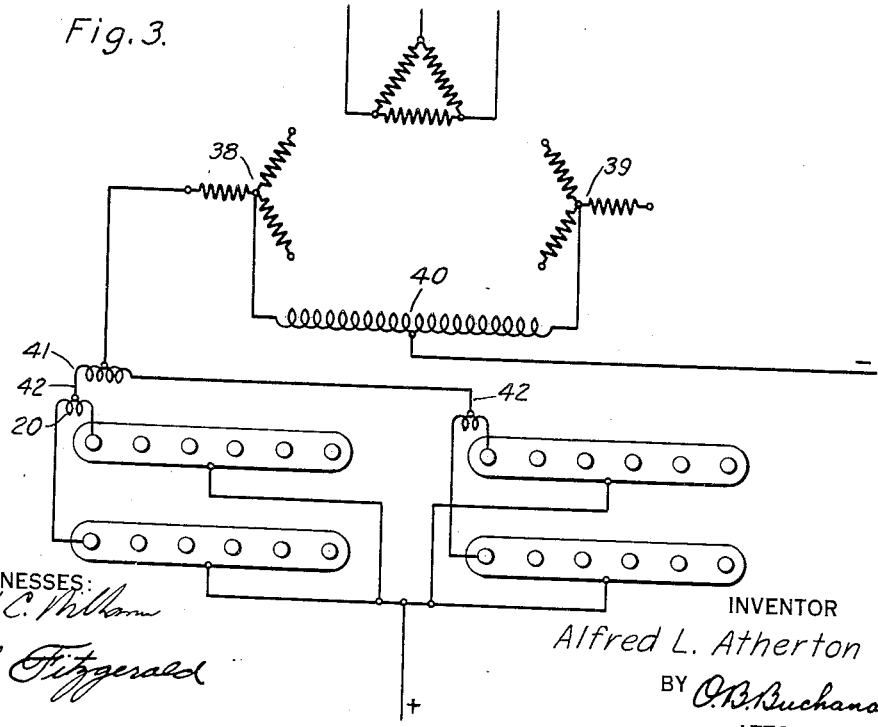

Figure 3 shows a connection in which a less expensive transformer is utilized, but which requires more auxiliary balance coils. In this connection there are only two star-connected transformer secondary windings 38 and 39, diametrically out of phase with each other, with the star points joined by an interphase balance coil 40, the mid-point of which is connected to the negative direct-current bus. Each of the six terminal phases of the secondary windings 38, 39 terminates in the mid-point of an intermediate balance coil 41, of which there are six, thus providing twelve terminals 42. Each of the twelve terminals 42 terminates, as before, in an anode reactor or balance coil 20. The intermediate balance coil 41 performs, for the pairs of rectifier-tanks, the same function which the anode balance coil 20 performs for the individual tanks of each pair, so that proper conditions of balanced parallel operation are maintained.

The anode balancing reactors 20, as well as the intermediate balance coils 21 are so designed that, in the event that one of the individual tanks or sections is removed from operation, the impedance interposed by the fact that the current is traversing only half of the balance coils effected by such removal will be sufficient to keep down the current in the remaining tank of the pair to a value substantially equal to the currents carried by the other rectifiers. In the combination shown in Figure 3 the intermediate balance coils 41 have a strong effect tending to maintain the same total current in the left-hand pair of tanks as in the right-hand pair. The same function is performed, in Figure 1, by the interphase balance coils 15 and 16, and to a lesser extent, in Figure 2, by the mutual reactances between the various secondary windings. When one tank of the left-hand pair, for example, is removed from operation, there would be a strong tendency for the remaining tank on that side to carry the same load as the two right-hand tanks, if it were not for the impedance offered by the individual anode balancing reactors 20, which can be readily made to cause the division of current to be approximately equal, in the three remaining tanks.

Figure 4:
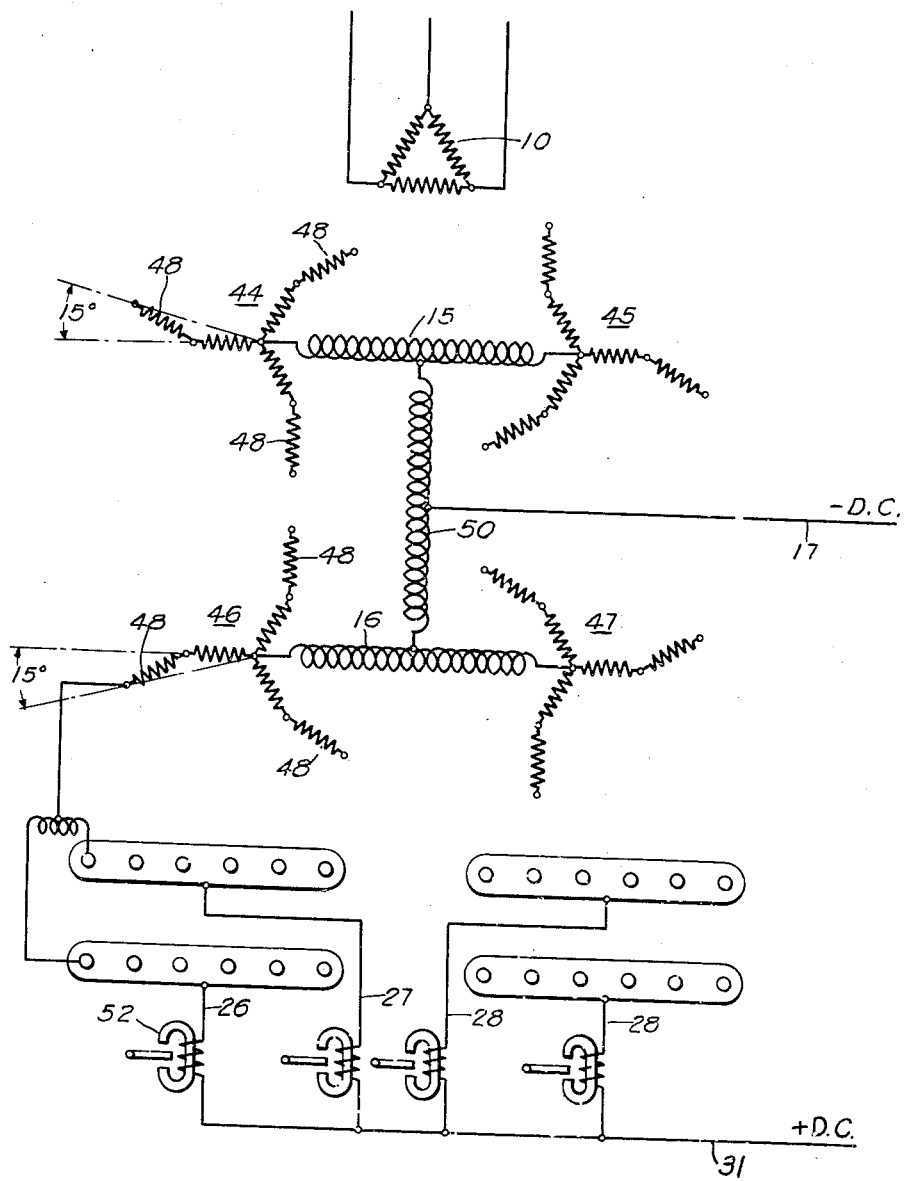

Figure 4 shows a delta-double zig zag transformer consisting of a delta-connected primary winding 10 and four zig zag secondary windings 44, 45, 46 and 47. These four zig zag secondary windings consist of star-connected elements similar to the windings 11, 12, 13 and 14 of Figure 1, in each phase of which are added additional so-called zig zag transformer winding connections 48 of such phase and magnitude as to cause the zig zag terminal phase to lead the star phase by 15°, in the two diametrically opposed windings 46 and 47, and to lag behind the star phase by 15° in the other two windings 44 and 45. The zig zag winding terminals of the secondary groups 44 and 45, being thus out of phase with the zig zag winding terminals of the secondary groups 46 and 47, it is necessary to utilize a third interphase balance coil 50 between the mid-points of the balance coils 15 and 16 which were utilized in Figure 1, the negative direct-current circuit-conductor 17 being joined to the mid-point of the interphase balance coil 50. The two secondary winding groups 46 and 47 of Figure 4, corresponding to the winding groups 13 and 14 in Figure 1, supply power for the left-hand pair of rectifier tanks, while the other two winding groups supply power for the right-hand pair of rectifier tanks.

To avoid great circumlocution of language, I have defined the zig zag winding groups as consisting of certain star-connected groups and certain additional or so-called zig zag connections. It is perfectly obvious that these zig zag connections could be put at the star point and the former star-connected windings put at the terminal point of each zig zag phase, and I desire that my language be construed to cover such obvious variation in structure.

In Figure 4 I have shown each of the cathode-leads 26, 27, 28 and 29 as being provided with an individual polarized or reverse-current relay or indicator 52. In ordinary operation, when a back-fire occurs in any of the individual sections, ordinarily the entire group of sections will be tripped out as a unit, so as to relieve the short-circuit between the two short-circuited anodes, and as soon as the vacuum pressure conditions and other conditions such as temperature and the like are satisfactory, it will be automatically tripped back into service. It may sometimes happen that a single faulty section may cause the unit to trip out more frequently than it should. I, therefore, contemplate the use of these individual polarized relays or back-fire indicators 52, for the purpose of showing the station attendant which section is at fault, enabling him to disconnect such section from operation and give it the necessary treatment to correct whatever it is that caused it to back-fire too frequently.

Figure 5:
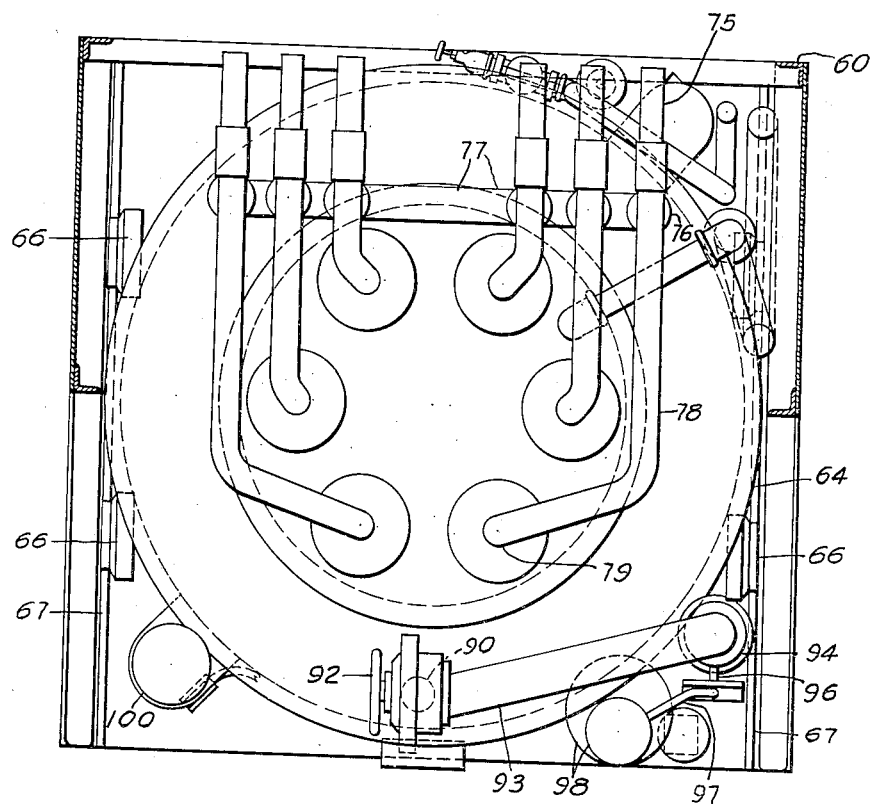
Fig. 5 is a plan view of one of my rectifier sections.

The physical appearance of the assembly of two sections in a single unit, which may be multiplied to include as many pairs of sections as may be desired, is shown in Figures 5, 6 and 7. I utilize a metal supporting frame 60 which is insulated from the ground by means of insulating feet 61. The supporting structure is designed to support two rectifier tanks or sections 63 and 64, one on top of the other, and the tanks are provided with suitable disconnectable, plug-in mountings. In the particular form of the invention shown in the drawings, this disconnectable mounting is of the truck type, comprising a supporting truck having wheels 66 rolling on rails 67 carried by the supporting structure.

Referring more particularly to Figure 7, it will be noted that the polyphase supply leads from the transformer are connected to a plurality of terminals 69 at the top of the supporting structure 60. These terminals are connected to the mid-points of the anode balance coils 20 which are also mounted in a row on the top of the supporting frame. Adjacent to the anode balancing reactors 20 may be a row of capacitors 70 or other protective means for protecting the rectifiers against surges, in any manner well known to the art. Each of the anode balance coils 20 has two terminal leads 71 and 72, of which one lead, 71, is connected to an anode-lead connecting-pin or plug 73 which is suitably mounted on an insulator 74 carried by the supporting frame, and which is adapted to be disconnectably engaged by a spring-finger mechanism or jack 75 which is carried by the top tank 63, being mounted on an insulator 76 carried by a terminal board 77 on the top of the tank. A strap-connector 78 connects the terminal jack 75 to its appropriate anode lead, such as 79. The other end-terminal 72 of the anode balance coil 20 is connected to a similar jack 80 for the anode-lead detachable connections of the bottom tank 64. It will be understood that the detachable anode-lead connections just described will be duplicated for the plurality of anode-leads of each tank.

As shown at the bottom of Figure 7, each tank is also provided, at its rear end, with a detachable cathode-lead connection 82 which co-operates with a contact pin or member 83 carried by the supporting frame. The cathode-lead jack 82 is shown also in Figure 6 just to the left of the center line at the bottom of each tank. The bottom tank in Figure 7 is partly broken away to show this cathode-lead connection 82 at the far side of the center line of the tank. As shown in connection with the top tank 63 of Figure 7, as well as in Figure 6, both tanks are provided with one or more detachable plug connections 86 for a plurality of auxiliary leads for controlling and/or indicating the operation of the several tanks. These auxiliary detachable plug connections 86 cooperate with complementary parts 87 carried by the supporting frame.

Each of the rectifier tanks or sections 63 and 64 is a complete unit in itself. Preferably it is constructed as shown and described in my application, Serial No. 589,415, filed January 28, 1932, entitled Central-blast rectifier and water temperature controlling means therefor. To avoid complication, some of the equipment which is mounted on the side of the rectifier tank is omitted from the top rectifier 63 in Figure 7, but it is to be distinctly understood that the two tanks are in every way duplicates of each other.

The principal equipment which is to be seen, more particularly in Figures 5 and 7, mounted on the sides of the tanks 63 and 64, and comprising an integral part thereof, are the evacuating means and the connections for the various water jackets or coolers of the rectifier.

The evacuating means consist of a vacuum pumping pipe connection 90, for instance, Figure 7, which comes out through the cover plate 91 of the rectifier and leads to a hand valve 92, from which a pumping connection 93 leads to the top of a mercury-vapor vacuum pump 94 which is provided, on its bottom, with a heater 95. The mercury pump 94 is provided with a discharge pipe 96, which leads through suitable connections 97 to the top of an interstage reservoir and barometric seal 98, from which a pipe (not shown), leads to an oil-sealed rotary pump 100 (Figure 5). Suitable vacuum-responsive devices (not shown), for affording indications and automatic control, are desirably utilized, as in any metal-tank mercury-arc rectifier installation.

The water circulating system for each tank is preferably that which is shown and claimed in my last-mentioned application. Provision of the cooling water necessitates the use of a supporting frame which is furnished with a supply pipe or manifold 102 for incoming water, as well as a drain pipe 103. The supply pipe 102 is connected to each rectifier tank through a valve 104 and a flexible hose connection 105 which is joined to a valve or so-called water-flow regulator 106 on the back of the tank. The water-flow regulator is an integral part of the terminal head of a temperature regulator 107 which is described in my aforesaid application. From the bottom of the water regulator 106, a pipe connection 108 leads to the bottom of the tank, where it enters the tank cooler 109. The water leaves the top of the tank cooler through a pipe 111 and enters a cooler inside of the tank, leaving the latter by means of a pipe 112 and an insulating hose connection 113, terminating in a T-joint 114 which is connected both to the cathode cooler 115 and a pipe connection 116 to the bottom of a water heater 117. The normal flow of water is through the cathode cooler 115, rather than through the heater connection 116.

After passing through the various coolers of the rectifier, as described in my copending application, the water emerges from the cover plate through an outlet pipe 120, which leads to a T-connection 121, which is connected both to a drain pipe 122 and to a pipe 123 which leads to a water pump 124, from which water is discharged to the top of the heater 117 through a pipe 125. The water pump 124 is driven by a motor 126, which is also structurally associated with the temperature-responsive regulator 107.

The discharge water is collected from the drain pipe 122 by a collecting funnel 128 and discharged through either a large flexible hose connection 129, as shown in connection with the bottom tank 64 of Fig. 7, or a suitable trough arrangement 130, as shown in connection with the top tank 63 in Fig. 7, from which connection is made to the drain pipe 103 on the frame.

The flexible hose connection 105 for the inlet water, and some sort of drain-connection means 129 or 130, for permitting freedom of a certain amount of limited outward movement of the tank without interrupting the water flow, are quite necessary in order to permit a faulty tank to be drawn out sufficiently to break the various detachable plug connections, as indicated by the position of the bottom tank 64 in Fig. 7. This makes it possible for the station attendant to disconnect one of the sections electrically, without disturbing its cooling connections, so that if need be, a treating-out process may be carried on with the tank in the partially withdrawn position, as shown at the bottom of Fig. 7, with a minimum of delay.

There are marked benefits in my sectional arrangement, from the standard of flexibility in application and use. Any defect which requires a major maintenance operation for its correction is almost certain to be limited to a small part of the total rectifier capacity, in my sectionalized design, leaving the balance of the sections available for use during the time of repairs or retreatment of the faulty section. This is a stand-by capacity feature of major value.

The idea of building the rectifier structure in sections, but installing (mounting), switching or controlling and operating the sections as a single unit, makes possible, also, a considerable saving in the stand-by capacity which is required, because a single tank section will suffice, instead of an entire large rectifier tank having a capacity equal to the aggregate of all of my tank sections.

The project for sectionalizing, together with the engineering development in working out sections of suitable dimension and proportion, makes available an increased degree of reliability, an increased flexibility in application and use, a marked improvement in manufacturing requirements, and an efficiency advantage of over one per cent of the entire kilowatt rating of the rectifier.

I contemplate that there will be a separate control of the water temperature and of the vacuum for each of the sections of my sectionalized rectifier, each section being complete, in these respects. In one sense, this is a complication, but in another sense it is expected that it will be of considerable benefit, because it makes possible a closer control of local conditions, at various points of the several arcs, than could be secured in a single tank and with a single control.

The subject-matter of the present application is more or less completely shown and discussed in my paper presented before the American Institute of Electrical Engineers on January 28, 1932.

I claim as my invention:

1. A large metal-tank mercury-arc rectifier installation comprising a transformer-means for supplying power, a plurality of separate rectifier-tanks grouped as a unit, each rectifier-tank having pipe-connections for circulating a liquid heat-interchange medium, a common direct-current circuit energized from all of the rectifier-tanks in parallel, means for energizing the several anodes of all the rectifier-tanks from said transformer-means in such manner that sufficient effective impedance is in series with each anode to make it operate satisfactorily in parallel with an anode in another tank at any moment, an insulated supporting structure having terminals for the anode and cathode leads and having pipe-connections for the aforesaid liquid medium, and a separate plug-in, disconnectible mounting for each rectifier-tank in said supporting-structure.

2. A large metal-tank mercury-arc rectifier installation comprising a transformer-means for supplying polyphase power, a plurality of separate polyphase rectifier-tanks grouped as a unit, each rectifier-tank having a plurality of anode-leads and a cathode lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with at least one other anode in at least one other tank at any moment, characterized by a supporting-structure having terminals for the anode and cathode leads, and a separate plug-in, disconnectible mounting for each rectifier-tank in said supporting-structure.

3. A large metal-tank mercury-arc rectifier installation comprising a transformer-means for supplying power, a plurality of separate rectifier-tanks grouped as a unit, and means for energizing the several anodes of all the rectifier-tanks from said transformer-means in such manner that sufficient effective impedance is in series with each anode to make it operate satisfactorily in parallel with at least one other anode in at least one other tank at any moment, characterized by a supporting-structure having terminals for the anode and cathode leads and auxiliary leads for controlling and/or indicating the operation of the several tanks, and a separate plug-in, disconnectible mounting for each rectifier-tank in said supporting-structure.

4. A large metal-tank mercury-arc rectifier installation comprising a transformer-means for supplying polyphase power, a plurality of separate polyphase rectifier-tanks grouped as a unit, each rectifier-tank having a plurality of anode-leads and a cathode lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with one or more other anodes at any moment, each rectifier-tank having pipe-connections for circulating a liquid heat-interchange medium, in combination with a supporting-structure having terminals for the anode and cathode leads and having pipe-connections for the aforesaid liquid medium, and a separate disconnectible mounting for each rectifier-tank in said supporting-structure.

5. A large metal-tank mercury-arc rectifier installation comprising a transformer-means for supplying polyphase power, a plurality of separate polyphase rectifier-tanks grouped as a unit, each rectifier-tank having a plurality of anode-leads and a cathode lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with one or more other anodes at any moment, each rectifier-tank having pipe-connections for circulating a liquid heat-interchange medium, in combination with a supporting-structure having terminals for the anode and cathode leads and having pipe-connections for the aforesaid liquid medium, and a separate plug-in, disconnectible mounting for each rectifier-tank in said supporting-structure, said mountings including flexible hose-connections for said liquid medium.

6. A large metal-tank mercury-arc rectifier installation comprising a plurality of separate rectifier-tanks grouped as a unit, each rectifier-tank having pipe-connections for circulating a liquid heat-interchange medium, a common supporting-structure having terminals for the anode and cathode leads and having pipe-connections for the aforesaid liquid medium, and a separate disconnectible mounting for each rectifier-tank in said common supporting-structure.

7. A large metal-tank mercury-arc rectifier installation comprising a plurality of separate rectifier-tanks grouped as a unit, an individual evacuating means for each rectifier-tank, a common supporting-structure having terminals for the anode and cathode leads, and a separate disconnectible mounting for each rectifier-tank, with its associated pumping means, in said common supporting-structure.

8. A large metal-tank mercury-arc rectifier installation comprising at least one pair of separate rectifier-tanks grouped as a unit, a common direct-current circuit energized from all of the rectifier-tanks in parallel, a common supporting-structure having terminals for the anode and cathode leads, a plurality of balancing reactors, half as many as the total number of anode-lead terminals, mounted on said supporting-structure, the reactors being connected between the anode-lead terminals for corresponding anodes in the two tanks of each pair, means for connecting intermediate points of the reactors to terminals for a source of alternating-current supply, and a separate plug-in, disconnectible mounting for each rectifier-tank in said supporting-structure.

9. A large metal-tank mercury-arc rectifier installation comprising a transformer-means for supplying polyphase power, at least one pair of separate polyphase rectifier-tanks grouped as a unit, each rectifier-tank having a plurality of anode-leads and a cathode-lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with at least one other anode in another tank at any moment, characterized by a plurality of balancing reactors, half as many as the total number of anode-leads, connected between the corresponding anodes in the two tanks of each pair, and means for suitably energizing the intermediate points of the reactors from said transformer-means.

10. A large metal-tank mercury-arc rectifier installation comprising a transformer-means for supplying polyphase power, four separate polyphase rectifier-tanks grouped as a unit, each rectifier-tank having a plurality of anode-leads and a cathode-lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with one or more other anodes at any moment, said anodes being in separate tanks, said transformer-means comprising two diametrically disposed three-phase star-connected secondary winding groups, an interphase balance coil between the two star connections, an individual anode balance coil having an intermediate point connected to each of the six terminals of the two three-phase winding groups, and a smaller individual anode balance coil having an intermediate point connected to each of the twelve terminals of the six first-mentioned anode balance coils, one terminal of each of the twelve smaller anode balance coils being connected to an anode-lead.

11. A large metal-tank mercury-arc rectifier installation comprising a transformer-means for supplying polyphase power, four separate polyphase rectifier-tanks grouped as a unit, each rectifier-tank having a plurality of anode-leads and a cathode-lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with one or more other anodes at any moment, said anodes being in separate tanks, co-phasal three-phase star-connected secondary winding groups, and two other co-phasal three-phase star-connected secondary winding groups, the second-mentioned winding groups being diametrically disposed with respect to said first-mentioned winding groups, balance-coil means between the star points of the first and second-mentioned winding groups, and an individual anode balance coil having an intermediate point connected to each of the twelve terminals of said winding groups, one terminal of each of said anode balance coils being connected to an anode-lead.

12. A large metal-tank mercury-arc rectifier installation comprising a transformer-means for supplying polyphase power, four separate polyphase rectifier-tanks grouped as a unit, each rectifier-tank having a plurality of anode-leads and a cathode-lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with one or more other anodes at any moment, said anodes being in separate tanks, said transformer-means comprising two co-phasal three-phase star-connected secondary winding groups, and two other co-phasal three-phase star-connected secondary winding groups, the second-mentioned winding groups being diametrically disposed with respect to said first-mentioned winding groups, an interphase balance coil connected between the star point of one of the two first-mentioned co-phasal winding groups and the star point of one of the two second-mentioned co-phasal winding groups, another interphase balance coil connected between the star points of the two remaining winding groups, a negative direct-current circuit connection to the two mid-points of the two interphase balance coils, and an individual anode balance coil having an intermediate point connected to each of the twelve terminals of said winding groups, one terminal of each of said anode balance coils being connected to an anode-lead.

13. A large metal-tank mercury-arc rectifier installation comprising a transformer-means for supplying polyphase power, four separate polyphase rectifier-tanks grouped as a unit, each rectifier-tank having a plurality of anode-leads and a cathode-lead, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with one or more other anodes at any moment, said anodes being in separate tanks, said transformer-means comprising two co-phasal three-phase star-connected secondary winding groups, and two other co-phasal three-phase star-connected secondary winding groups, the second-mentioned winding groups being diametrically disposed with respect to said first-mentioned winding groups, additional transformer winding connections making zig-zag transformer connections out of each of said star-connected groups, the zig-zag terminal phase being caused to lead the star-phase by 15° in one half of each of said first and second-mentioned groups and being caused to lag behind the star-phase by 15° in the other halves, a balance coil connecting the star points of the two leading halves, another balance coil connecting the star points of the two lagging halves, a third balance coil being connected between intermediate points of said two first-mentioned balance coils, and an individual anode balance coil having an intermediate point connected to each of the twelve terminals of said winding groups, one terminal of each of said anode balance coils being connected to an anode-lead.

14. A large metal-tank mercury-arc rectifier installation comprising a transformer-means for supplying power, at least one pair of separate rectifier-tanks grouped as a unit, each rectifier tank having a starting means, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with at least one other anode at any moment, said anodes being in separate tanks, said energizing means comprising balance-coil means so disposed as to impose a sufficiently high anode voltage on any rectifier tank or tanks which do not start as soon as some other tank or tanks, whereby the unstarted tanks are quickly started.

15. A large metal-tank mercury-arc rectifier installation comprising a transformer-means for supplying power, a plurality of pairs of separate rectifier-tanks grouped as a unit, a common direct-current circuit energized from all of the rectifier-tanks in parallel, and means for energizing the several anodes of all the rectifier-tanks from said transformer-means in such manner that sufficient effective impedance is in series with each anode to make it operate satisfactorily in parallel with at least one other anode in at least one other tank at any moment, said energizing means comprising balance-coil means so disposed as to have sufficient mutual-reactance voltage to approximately equalize the division of currents in the several anodes carrying currents simultaneously when all of the tanks are operating, and to have the proper amount of self-reactance voltage to perform approximately the same equalization of currents when one of the tanks is disconnected.

16. A large capacity mercury-arc rectifier comprising a polyphase transformer having a double star secondary winding, an interphase balance coil for dividing the load, a rectifier comprising a plurality of similar sections in individual tanks, a plurality of anodes in each section, each terminal of the secondary of the transformer supplying current to a plurality of anodes in different sections, a frame for supporting the sections as a unitary assembly, a plurality of anode balance coils mounted on the frame for dividing the current between a plurality of anodes which are connected to one transformer phase, terminals mounted on the frame for connection to the section, corresponding terminals carried by the sections, said terminals cooperating for providing separable connections for the sections.

17. A power rectifier comprising a polyphase transformer for furnishing alternating-current power to said rectifier, a plurality of polyphase rectifier sections in separate tanks, a frame for supporting the sections, a direct-current bus for connecting each of said sections to a direct-current feeder, a manifold for supplying a cooling medium to each of said sections, a vacuum pumping system for each of the sections, a terminal board on each of the sections, corresponding terminal boards on the frame, connecting links between the corresponding terminals, said links being severable by relative movement of the sections and the frame, the manifold connections being extensible for permitting sufficient movement of the sections relative to the frame to break said links without interrupting the flow of the cooling medium, each phase terminal of said transformer supplying current to a plurality of anodes in different sections, and balance coils mounted on the frame for dividing the current satisfactorily between the anodes which are connected to a common phase terminal of the transformer.

ALFRED L. ATHERTON.